United States Patent [19]

Baghdasarian

[11] Patent Number: 4,786,064
[45] Date of Patent: Nov. 22, 1988

[54] CONVERTIBLE INFANT SEAT

[76] Inventor: Varouj G. Baghdasarian, 1103 S. Stelling Rd., Cupertino, Calif. 95014

[21] Appl. No.: 73,594

[22] Filed: Jul. 15, 1987

[51] Int. Cl.[4] .............................................. B62B 3/02
[52] U.S. Cl. ..................................... 280/30; 280/47.4; 280/643; 280/648; 280/658; 297/130; 297/250
[58] Field of Search ................ 280/647, 30, 642, 643, 280/648, 33.99 B, 37, 47.4, 650, 658; 297/255, 250, 377, 130

[56] References Cited

U.S. PATENT DOCUMENTS

| | | | |
|---|---|---|---|
| 2,435,733 | 2/1948 | Belyeu | 280/648 |
| 2,625,407 | 1/1953 | Varner | 280/643 |
| 2,675,064 | 4/1954 | Welsh | 280/47.4 |
| 2,706,642 | 4/1955 | Yarnell | 280/643 |
| 2,720,911 | 10/1955 | Lantz | 280/30 |
| 2,803,468 | 8/1957 | Thompson | 280/30 |
| 2,990,190 | 6/1961 | Eriksen | 280/30 |
| 3,083,997 | 4/1963 | Chreist, Jr. | 280/30 |
| 3,116,069 | 12/1963 | Dostal | 280/30 |
| 3,290,050 | 12/1966 | Ezquerra | 280/30 |
| 3,463,504 | 8/1969 | Petry et al. | 280/31 |
| 3,549,164 | 12/1970 | Raynor | 280/30 |
| 3,829,113 | 8/1974 | Epelbaum | 280/30 |
| 3,944,241 | 3/1976 | Epelbaum | 280/30 |
| 4,480,870 | 11/1984 | von Wimmersperg | 297/377 |
| 4,570,956 | 2/1986 | Dyer | 280/30 |
| 4,602,395 | 7/1986 | Kassai | 280/648 |
| 4,620,711 | 11/1986 | Dick | 280/30 |
| 4,634,175 | 1/1987 | Wise | 297/377 |

FOREIGN PATENT DOCUMENTS

| | | | |
|---|---|---|---|
| 42347 | 12/1981 | European Pat. Off. | 280/643 |
| 2486894 | 1/1982 | France | 280/643 |
| 420525 | 4/1947 | Italy | 280/642 |

Primary Examiner—David M. Mitchell
Assistant Examiner—Eric Culbreth
Attorney, Agent, or Firm—Townsend & Townsend

[57] ABSTRACT

An infant seat which converts from a car seat into a stroller. The infant seat comprises a chair connected to a wheel frame on which the wheel set is mounted. The wheel set consists of front and rear wheels connected by a linking means. When the wheel frame is in a stowed condition, it supports the chair in either a forward-facing or rearward-facing car seat configuration. The wheel set is stowed behind or below the chair while the car seat is secured to the automobile seat by the automobile safety belts threaded through the wheel frame. To convert the car seat into a stroller, the wheel frame rotates about its pinned connections to the chair to simultaneously deploy the linked front and rear wheels. The chair back reclines with respect to the chair bottom to convert the stroller into a carriage. Modifications of the wheel frame allow the infant seat to be converted into an infant rocker. Accessories such as a sun shade and footrest also extend from the chair. A handle lock assembly secures the handle in a variety of positions. An articulated chair has side wall extenders which deploy as the back of the chair is reclined with respect to the chair bottom.

9 Claims, 8 Drawing Sheets

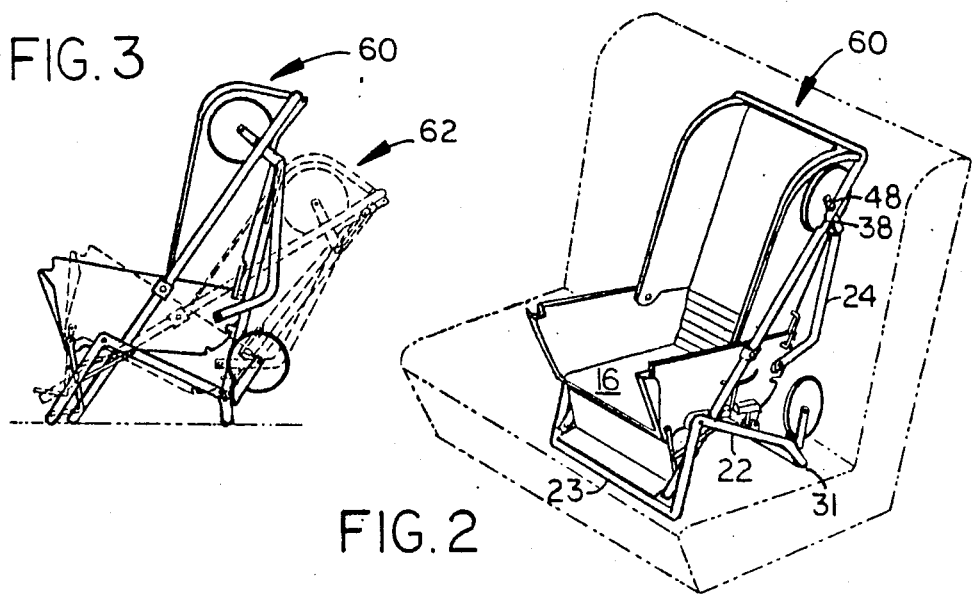
FIG. 3
FIG. 2
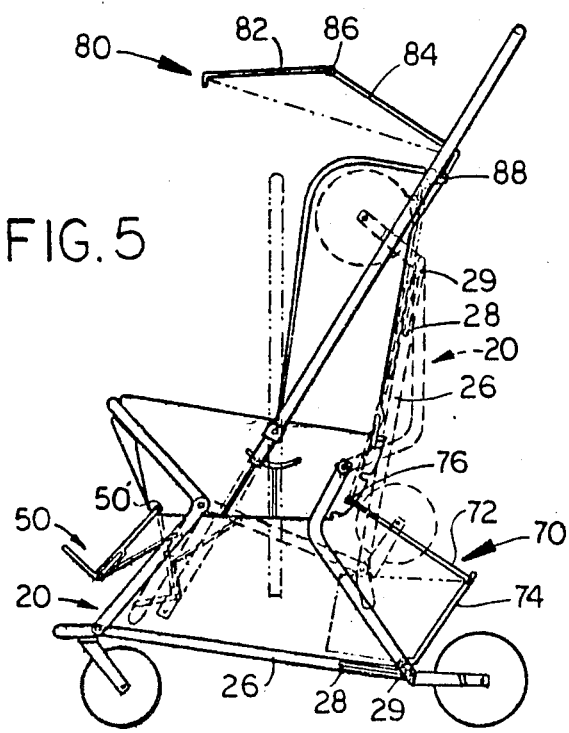
FIG. 5
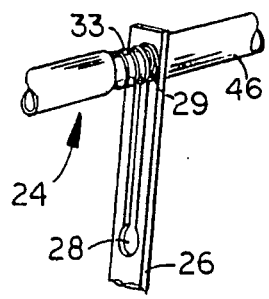
FIG. 6

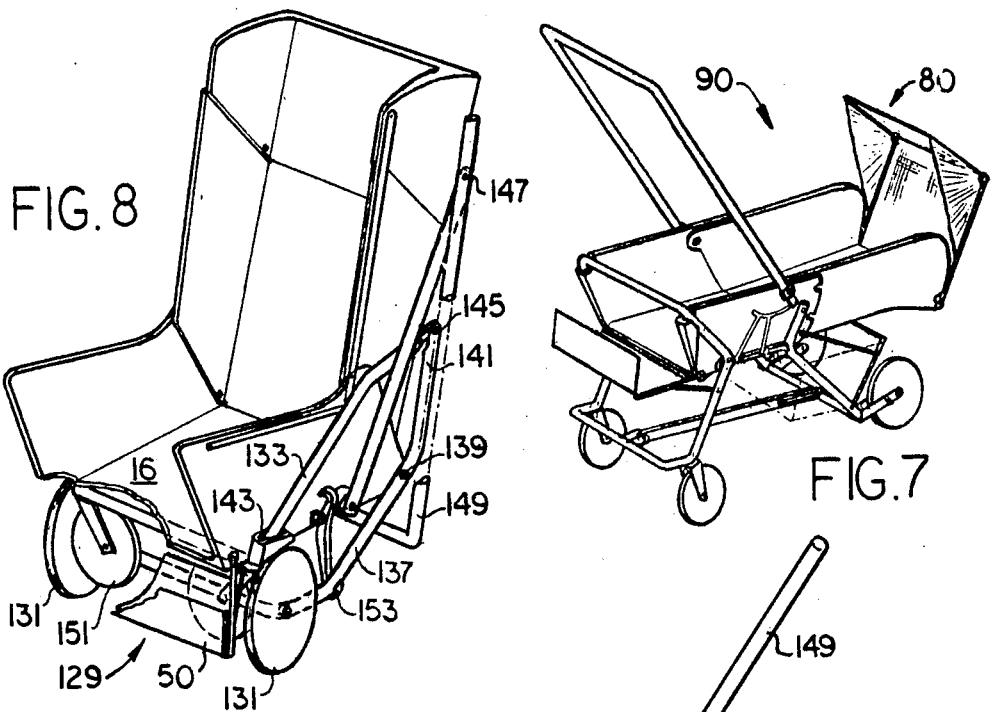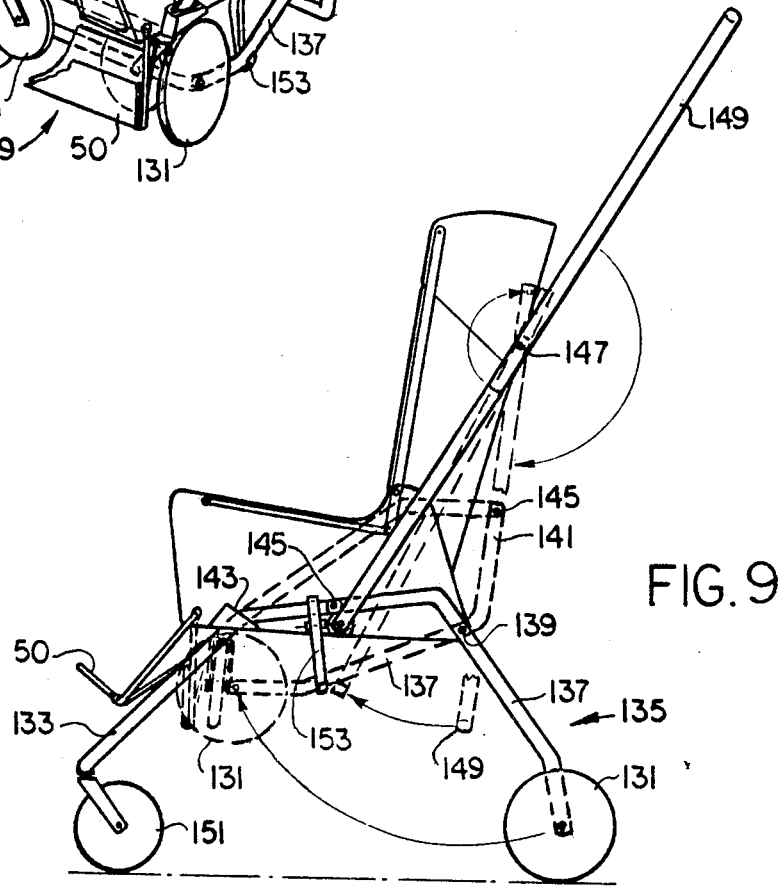

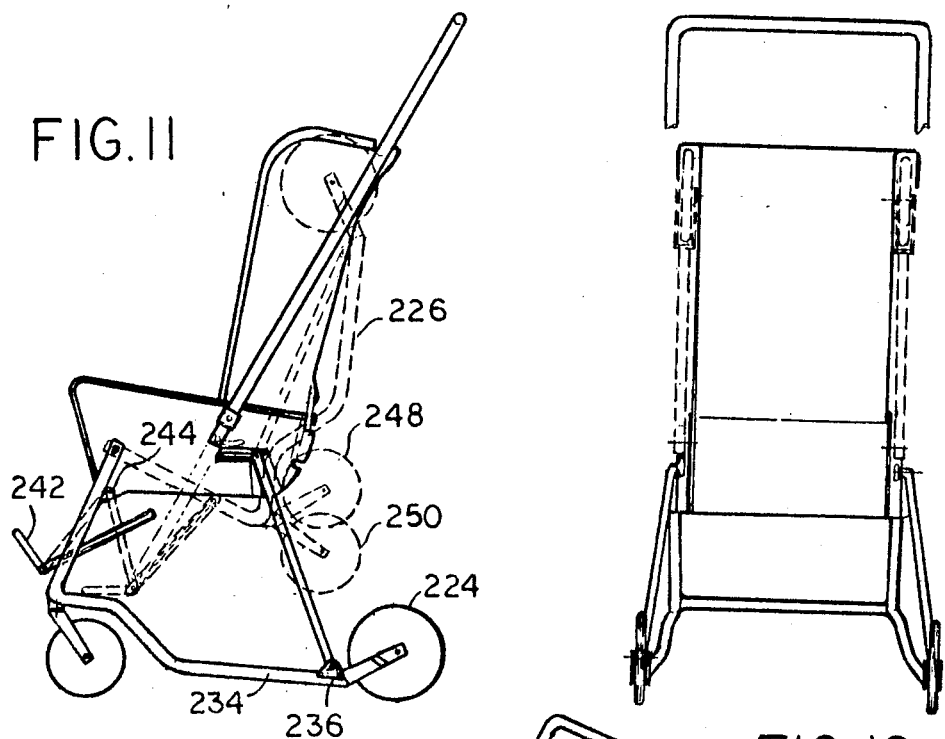
FIG.11
FIG.12
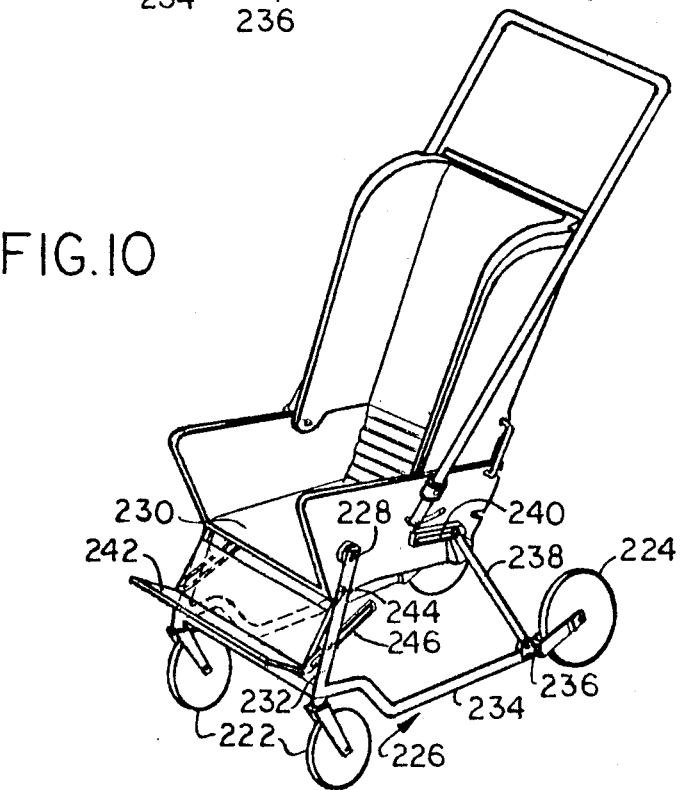
FIG.10

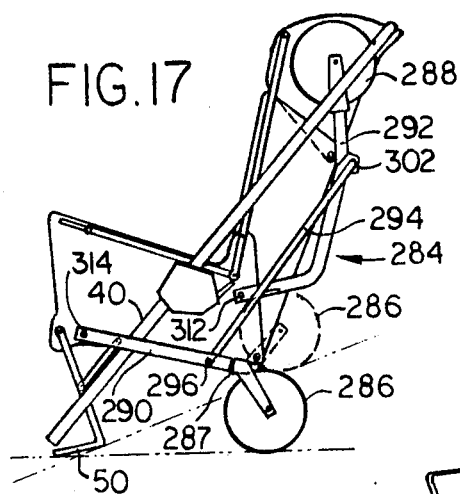
FIG. 17
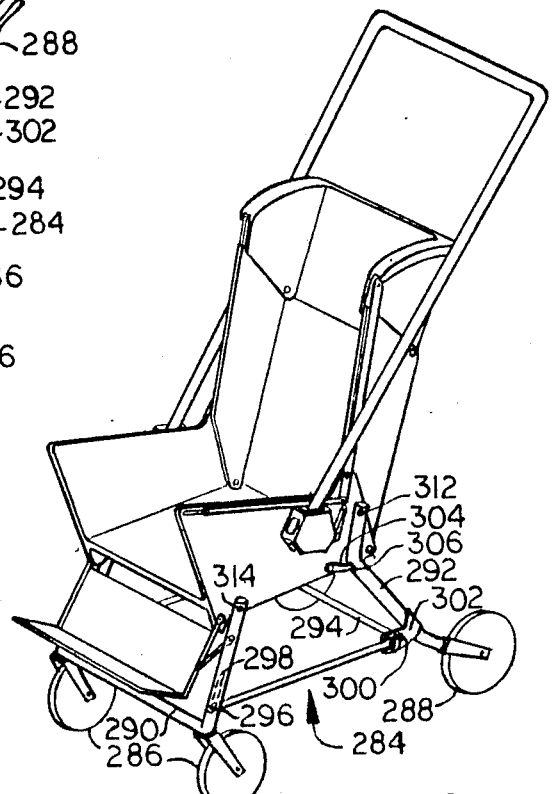
FIG. 16
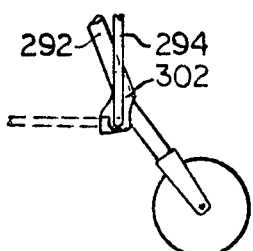
FIG. 19
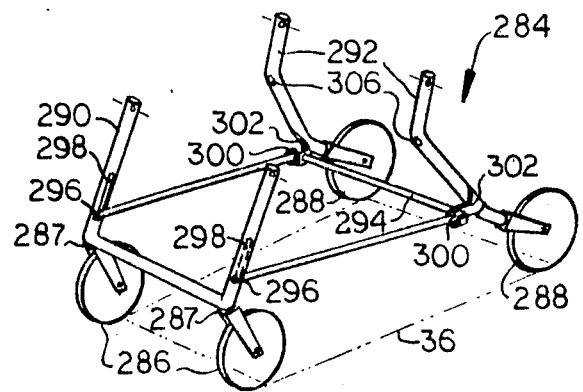
FIG. 20
FIG. 18

CONVERTIBLE INFANT SEAT

BACKGROUND OF THE INVENTION

1. Field of the Invention

The present invention relates to an infant seat which converts from a car seat to a stroller.

2. Description of the Prior Art

Safety considerations and legislation have made the use of car seats for infants and toddlers more prevalent. Such car seats are secured in either a rearward facing or forward facing position in the automobile depending on the size of the infant.

When away from home, strollers are commonly used to transport babies while the accompanying adult is walking and pushing the stroller. Since strollers are most often used when away from the home, strollers are often stored in the trunk or storage area of an automobile during the ride from the home to the eventual destination.

Baby furniture, such as car seats and strollers, is relatively expensive. Furthermore, the necessity of having both a car seat and stroller requires the occupation of valuable space within an automobile. Therefore, there is a need for an infant seat which is easily converted from a car seat into a stroller.

A number of such convertible car seats have been proposed. However, due to the strict safety requirements for car seats, a number of these structures have proved inadequate while being used as car seats. Further, the previously proposed devices have often resulted in unstable strollers due to very limited wheel bases or awkward handle arrangements, and require either assembly or a cumbersome manual operation to convert from car seat to stroller. Parents have proven to be reluctant to purchase and use such devices when they do not resemble conventional car seats when in the car seat configuration or when they do not resemble conventional strollers when in the stroller configuration.

SUMMARY OF THE INVENTION

The present invention provides an infant seat which consists of a chair, a wheel frame with a configuration depending on the particular embodiment, a wheel set, and a folding or a retractable handle. The wheel set and wheel frame cooperate to convert the chair from a car seat into a stroller. The wheel set is secured to the wheel frame and assumes two positions: first, a stowed position where the wheel set is safely and securely retracted, such that the wheel frame supports the chair and secures the chair to an automobile seat in either a rearward facing or forward facing configuration; and a deployed position in which the retractable handle is pulled away from the chair and the wheel frame is deployed away from the chair to form a conventional stroller wheel base.

With the wheel set in the stowed condition, the infant seat functions as and has the appearance of a conventional car seat. The wheel set in the deployed condition and the handle in the extended position creates a stroller of conventional appearance and a very stable wheel base structure. Further, the wheel frame is designed to synchronize the movement of the front and rear wheels and the foot rest such that they are simultaneously lowered into the deployed condition when the infant seat is converted from a car seat into a stroller.

BRIEF DESCRIPTION OF THE DRAWINGS

FIG. 2 is an isometric view of the first embodiment of the infant seat in a forward-facing car seat configuration.

FIG. 3 is a side view of the first embodiment in a forward-facing car seat configuration, with a rearward-facing configuration shown in broken lines.

FIG. 5 is a side view of the infant seat, wherein the solid lines illustrate the stroller configuration and the broken lines illustrate the forward-facing car seat configuration.

FIG. 6 is an isometric detail view of the rear wheel strut of the first embodiment of the infant seat.

FIG. 7 is an isometric view of the first embodiment of the infant seat in a carriage configuration.

FIG. 8 is an isometric view of a second embodiment of the invention in the infant seat configuration.

FIG. 9 is a side view of the second embodiment of the invention in the deployed condition with the stowed condition shown in broken lines.

FIG. 10 is an isometric view of a third embodiment in a stroller configuration.

FIG. 11 is a side view of the third embodiment illustrating the conversion from stroller to car seat.

FIG. 12 is a back view of the third embodiment.

FIG. 16 is an isometric view of a fifth embodiment in a stroller configuration.

FIG. 17 is a side view of the fifth embodiment in the stowed configuration with the rearward facing configuration shown in broken lines.

FIG. 18 is an isometric view of the fifth embodiment of the wheel frame.

FIG. 19 is a front view of the rear wheel of the fifth embodiment.

FIG. 20 is a side view of the rear wheel of the fifth embodiment with the linkage in the deployed condition shown in broken lines.

DETAILED DESCRIPTION OF THE PREFERRED EMBODIMENTS

Figure 1:
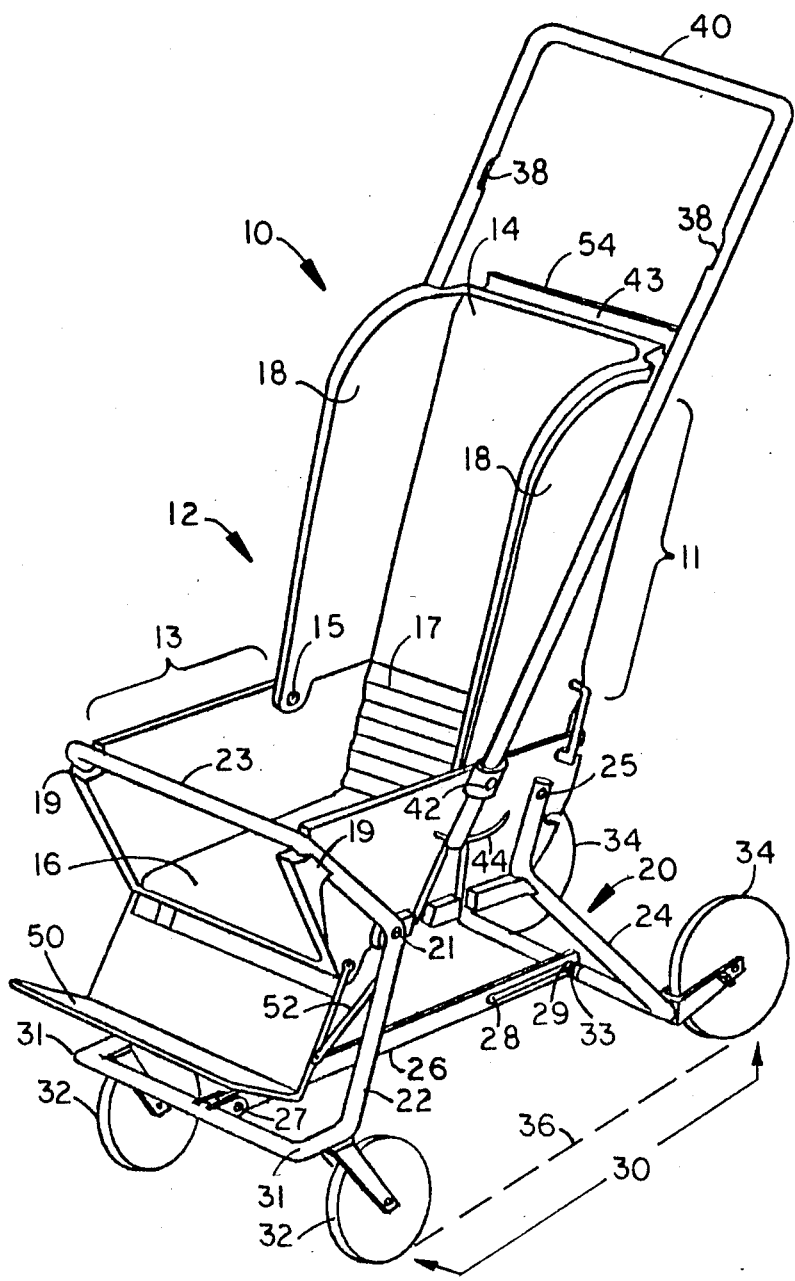
FIG. 1 is an isometric view of a first embodiment of the infant seat in the stroller configuration.
Figure 15:
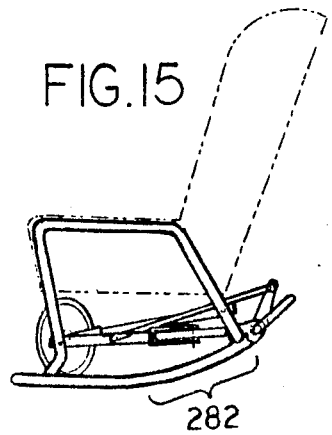
FIG. 15 is a side view of the fourth embodiment configured as a rocker.

The infant seat of the present invention is, by virtue of its novel structure, convertible from a car seat (FIGS. 2 and 3) to a stroller (FIG. 1). As will be made clear later in this discussion, the structure can also be modified to further convert the infant seat into a portable bed (FIG. 21), baby carriage (FIG. 7), and rocker (FIG. 15). Note that the rear wheels can also be stowed under the seat, as shown in FIG. 8. in an isometric view of the infant seat showing the wheels stowed under the seat bottom. FIGS. 1-7 cover a first embodiment of the invention. The remaining figures show additional embodiments of the invention.

FIG. 1 is an isometric view of a first embodiment of the convertible infant seat in its stroller configuration 10. As is typical of the conventional stroller, the stroller 10 consists of a chair assembly 12 which includes a back 14, a bottom 16 and two side panels 18. The chair assembly 12 is generally supported and surrounded by a wheel frame assembly 20 and a wheel set 30. Chair assembly 12 is generally lightweight and constructed of a moldable, durable plastic material, while the wheel frame assembly 20 is constructed from any suitable lightweight, rigid metallic or plastic material. This particular embodiment of chair assembly 12 is constructed in two segments jointed at joints 15. An additional embodiment of the chair will be discussed later. An upper chair section 11 is reclinable with respect to a lower chair section 13. The upper and lower sections are connected by a corrugated or otherwise flexible section 17.

The infant seat converts to and from stroller configuration 10 to the car seat configurations 60 and 62 shown in FIG. 3. FIG. 3 illustrates a forward-facing car seat configuration 60 with a rearward-facing car seat configuration 62 shown in broken lines (both shown facing in the same direction for ease of comparison). The forward-facing car seat 60 is generally used for fairly developed infants of approximately five months to two years of age while the rearward-facing configuration 62 is used for newborn to approximately five month-old infants.

Figure 4:
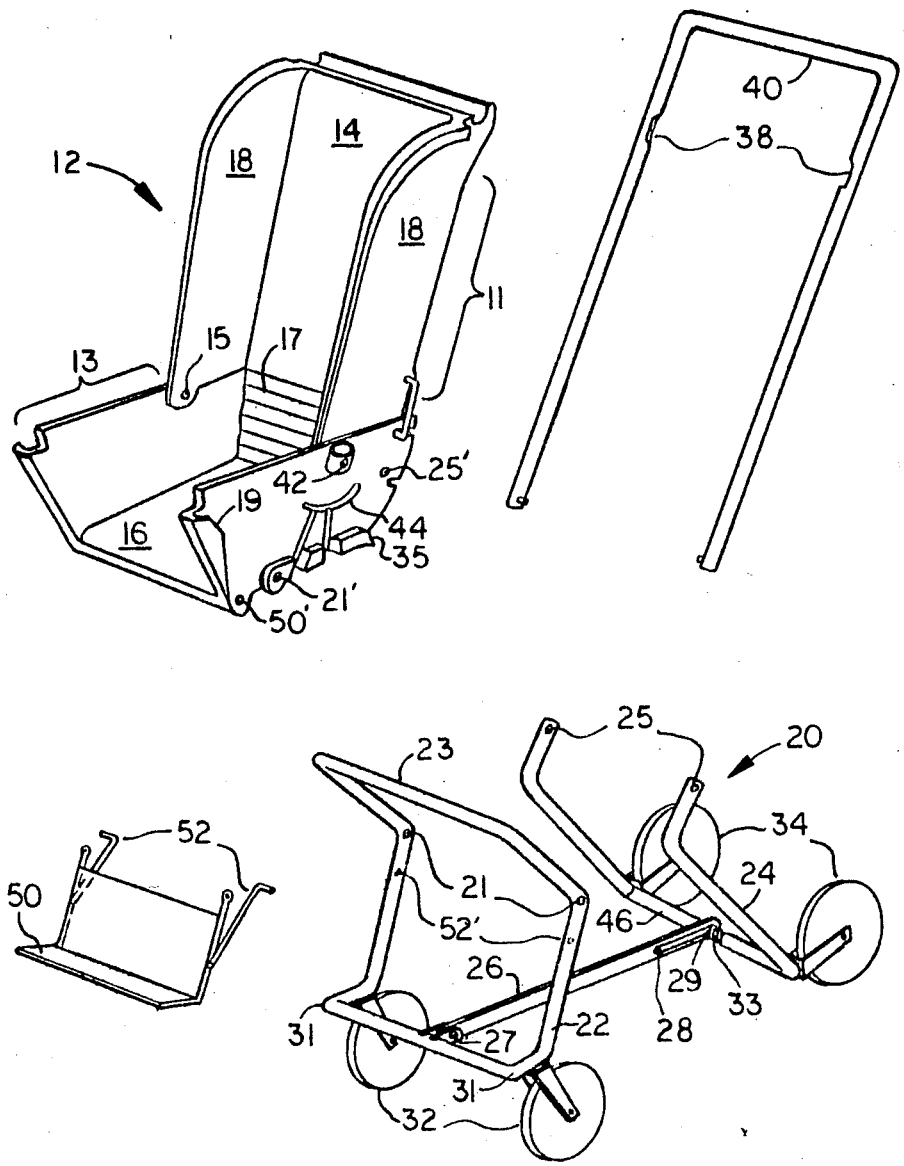
FIG. 4 is an isometric, exploded view of the major components of the first embodiment of the infant seat.

As can best be seen in FIG. 4, the wheel frame assembly 20 of this embodiment basically consists of a front wheel strut 22, a rear wheel strut 24 and a linkage 26 which connects front wheel strut 22 and rear wheel strut 24. Front wheel strut 22 consists of a frame piece which has a generally rectangular configuration loop 40 and which is bent at two opposed apex points 21 on opposite vertical portions of the loop. Front wheel strut 22 is pinned to the chair assembly 12 at the apex points 21 to the pivot points at apices 21' of the front portion of the lower chair section 13. Front wheels 32 are mounted at the lower loop corners of the generally rectangular section. Rear wheel strut 24 has a generally U-shaped configuration, with the slightly bent free ends 25 in pinned connection to the chair assembly 12 at pivot points 25' towards the back edge of the lower chair section 13. Rear wheels 34 are mounted to extend outwardly and behind opposite sides of the U-shaped frame piece.

Wheel set 30 consists of the front wheels 32 mounted to the front wheel strut 22 and the rear wheels 34 mounted to rear wheel strut 24. The tires on wheels 32, 34 are constructed from conventional rubber or synthetic rubber material. Wheels 32 are mounted to front wheel strut 22 on swivel mounts so as to be rotatable freely about generally vertical axes, while rear wheels 34 are rigidly mounted to rear wheel strut 24. While in the stroller configuration 10, the upper horizontal bar segment 23 of front wheel strut 22 forms the frontal restraint for the chair region of the stroller chair.

Handle 40 is affixed to the chair along its side panels 18, which in the stroller configuration 10, extends from the chair upwardly and behind chair back 14. If desired, handle 40 may be rotated about pivot collar 42 and along the curved portion of handle slot 44 such that handle 40 is extended upwardly and in front of chair back 14, such that an adult would push the stroller while facing the seated infant. Handle 40 telescopically retracts as shown in FIG. 2 when the infant seat is used as a car seat. Multiple locking positions are provided for handle 40 so that it may be used as a lifting handle. This allows the infant seat to also be used as a portable infant carrier as shown in FIG. 5 in phantom lines.

The portions of the frame assembly which extend below chair bottom 16, splay outwardly to form a wide wheel base 36, of which the wheels 32 and 34 form the corners. Wheel base 36 must be broad in comparison to the base area of chair assembly 12 in order to form a stable, safe base for the stroller.

FIG. 5 is a side view of the first embodiment of the infant seat with the stowed condition of the wheel frame 20 shown in broken lines. This view illustrates the relative positions of the wheel frame 20 with respect to the chair 12 in the stowed and deployed configurations.

The stroller may be further accessorized with a footrest 50 pivotally connected to the front edge of chair bottom 16 at pivot points 50' and linked via links 52 to the forward, lower portion of front wheel strut 22. Also, a sunshade 80 may be mounted at the upper edge of chair back 14 (FIGS. 5 and 7).

The infant seat of the present invention may also be provided with conventional padding, as well as with shoulder restraint and crotch restraint straps as is conventional (not shown).

The conversion procedure of the infant seat from the stroller configuration 10 into the car seat configurations 60 and 62 is best illustrated in FIG. 5. In this side view of the infant seat, the broken lines have been arbitrarily chosen to represent the infant seat as a forward-facing car seat 60 while the solid lines represent the infant seat in stroller configuration 10. The rearward-facing car seat 62 is not shown for the sake of simplicity and differs from the forward-facing car seat 60 in only a few minor respects. The conversion from forward-facing car seat 60 to rearward facing car seat 62 is accomplished by adjusting the linkage 26 to slide from a first locking position 29 to a second locking position 28.

The key to the simplified conversion of the infant seat of this invention in comparison to the conversion of prior art infant seats lies in the synchronization of the conversion procedure. The entire wheel frame and wheel set arrangement of the synchronized invention unfolds as a unit as the infant seat is converted from the more compact car seat configuration 60 or 62, to the stroller configuration 10 without having to remove the infant. While the infant seat is in one of the two possible car seat arrangements, the wheel frame and wheel set are said to be in a "stowed" condition. While the infant seat is being used as a stroller 10 or carriage, or any form requiring use of the wheels, the wheel frame and wheel set are said to be in a "deployed" condition.

In the embodiment of FIGS. 1-7, a linkage means between the front and rear wheels provides a synchronization of the wheel frame as it converts from one device to another. Linkage 26 is the synchronizing element by virtue of its tying together front wheel strut 22 and rear wheel strut 24. Linkage 26 has a pinned connection 27 in one end to the lower horizontal section of front wheel strut 22 while it has an axial slot at the other end to provide a pivotable and laterally moveable connection to rear wheel strut 24. A lock position 29 is provided to engage the width of the linkage 26 along the lower horizontal portion of rear wheel strut 24. In the deployed condition of stroller configuration 10, wheel base 36 is formed by the lower ends of front wheel strut 22 and rear wheel strut 24.

To achieve the stowed condition, front wheel strut 22 is unlocked from its lock position 19 and permitted to rotate about the pin joints at apex points 21. The wheel frame is pulled backward and upwardly towards upper chair section 11 such that rear wheel strut 24 rotates about pivot points 25 while front wheel strut 22 simultaneously rotates about the pin joints at apex points 21. Linkage 26 assures the simultaneous movement by its pin connection 27 to front wheel strut 22 and its slidable pin connection at lock position 29 to rear wheel strut 24.

Rear wheel strut 24 is rotated until rear wheels 34 are disposed on the outside of either side panel 18 of upper chair section 11. In so doing, linkage 26 pulls front wheel strut 22 so that the front wheels 32 are behind chair back 14. As the now car seat 60 or 62 rests on an automobile seat, the car seat is supported beneath chair bottom 16 by legs formed by the formerly upper horizontal section 23 of front wheel strut 22 and the formerly lower corners 31 of front wheel strut 22.

The differentiation between forward facing car seat 60 and rearward facing car seat 62 (see FIG. 3) lies in the slotted design of the synchronization linkage 26, which can be locked in either end of the slot at lock positions 28 or 29 to a pin-type connection on rear wheel strut 24 assisted by spring 33 (see FIG. 6). In the forward facing configuration 60, rear wheel strut 24 has its horizontal arm 46 locked into the upper end lock position 29 of the slot in linkage 26. In the rearward facing configuration 62, arm 46 is locked into the lower end 28 of the slot in linkage 26, thus causing the chair bottom 16 to tilt upwardly and chair back 14 to tilt backwardly.

To convert the car seat from the forward facing car seat configuration 60 to the rearward facing car seat 62, linkage 26 is disengaged from its locked position 29 by pulling linkage 26 along the axis of arm 46 of rear wheel strut 24. This action compresses spring 33. The weight of the chair 12 urges arm 46 downwardly along the seat to lock into lower end lock position 28. In so doing, the chair bottom 16 is tilted upwardly and chair back 14 is tilted backwardly so that the infant seat is in the rearward facing configuration 62.

To lock the frame assembly 20 into the stowed condition, handle 40 is pushed telescopically downwardly along handle pivot collar 42 on either side of the chair until the handle top locks into a seat 43 provided at the top of upper chair section 11, such that the rear wheels 34 are prevented from moving beyond the adjacent portions of handle 40 (FIG. 2). Other locks to further secure wheel frame assembly 20 in the stowed condition might also be provided.

To unlock the handle 40 to deploy the wheel frame 20, handle 40 is pulled upwardly until a depression 38 is against tab 48. At this point, the wheel frame 20 is free to rotate to the deployed condition.

Footrest 50 depends below the front edge of chair bottom 16 while the frame and wheel set are deployed in stroller configuration 10. As the wheel frame and wheel set are rotated toward the stowed configuration for car seat 60 or 62, pinned links 52 on either side of footrest 50, connecting footrest 50 to the lower (or rearward) segments of front wheel strut 22, rotate the footrest backward and underneath chair bottom 16. This can also be accomplished using only one link 52.

With the wheel frame and wheel set assembly in the deployed condition of the stroller configuration 10, the upper chair section 11 may be reclined with respect to chair bottom 16 and the lower chair section 13 to form a flat bed. With footrest 50 and sunshade 80 (FIG. 7) rotated upwardly and locked into place, an enclosed bed area is created. In this configuration, a baby carriage 90 configuration is produced as shown in FIG. 7. The handle 40 can then be pivoted about handle collar 42 and along handle slot 44 to lock in one of the two positions such that the carriage may be pushed from either end of the bed. The "head" end is determined by the sunshade 80.

A major concern with the previously known convertible car seats when used as strollers was their lack of stability. The present invention permits the wheel set to unfold into an acceptably stable wheel base 36 when it is deployed. The wheel base has enhanced stability when the rear wheels 34 are further apart than the front wheels 32. This forms a trapezoidal wheel base 36 (FIG. 18) for the stroller. However, the rear wheels 34 must not be hindered from stowing snugly against the chair assembly 12 while the infant seat is used as a car seat 60 or 62.

FIG. 8 illustrates a second embodiment of the wheel frame in which the rear wheels 131 stow alongside and beneath the chair. Front wheels 151 stow under chair bottom 16 and behind footrest 50. The front wheel strut 133 is generally a U-shaped frame similar to the rear wheel strut 24 of the first embodiment. The rear wheel assembly 135 consists of a U-shaped wheel frame 137 with two rear wheel assemblies 131. As shown in FIG. 9, each rear wheel 131 is mounted to the closed corner of rear wheel strut 137, connected to the rear side of the chair by pinned joint 139. Each of the free ends of front wheel strut 133 is connected to each free end of rear wheel strut 137 by pinned joints 145. Rear wheel frame assembly 135 may also consist of two identical rear wheel struts with or without a horizontal cross member such that it allows outward splaying of the two rear wheels in the deployed position. (Not shown.)

As shown by the arrow in FIG. 9, the wheel frame assumes the stowed condition by rotating the folding part of the handle bar 149 about pinned joints 147 to a second position toward the front end of the chair. The front wheel strut 133 while guided in guide holes 143 of the seat stows along side of the chair with front wheels 151, rotated 90° and stowed underneath the chair bottom 16. Latch 153 is used to secure the wheel frame in both stowed and deployed conditions.

The infant seat is supported by the handle 149 at its rear end and by the rear wheels 131 at its front end when the chair is in the forward facing stowed position, and by rear wheel strut 137 or on rear wheels 131 and chair seat lower back corners for the rearward-facing position. The seat belt secures the infant seat to automobile seat when threaded through the opening between the end 141 of rear wheel strut 137 and the chair back.

To convert the infant seat to its stroller configuration, handle 149 is deployed to its forward pushing position, then latch 153 is released to be disengaged from the wheel frame. As the chair is lifted, rear wheel strut 137 rotates about pin joint 139 to drop to its deployed position. In so doing, pin joint 145 forces the front wheel strut 133 to drop down to its deployed position while guided by the guide holes 143 of the chair seat. The wheel frame is locked in deployed position by latch 153 near pin joint 145. As shown in FIG. 9, the chair assembly in its stowed position rests on wheels 131 at its front end. By deploying handle 149, the chair assembly can be pulled in its stowed configuration on the two wheels 131 only. This feature helps to pull the chair assembly up stairs without having to deploy the wheel set.

A third, fourth and fifth embodiment of the wheel frame is shown in FIGS. 10-21. These embodiments also provide a trapezoidal wheel base in which the rear wheels are further apart than the front wheels.

Referring to FIGS. 10-12, in the third embodiment, the front wheels 222 and rear wheels 224 are mounted to a unitary wheel frame 226. Wheel frame 226 is mounted with pin joints 228 to the front edges of chair 230 along a U-shaped front wheel portion 232 of wheel frame 226. Bent side arms 234 curve to accommodate front wheels 222 and extend to ends 236 along which rear wheels 224 are mounted. A separate linkage is eliminated by the side arms 234 to which both front wheels 222 and rear wheels 224 are mounted. Rear wheel support struts 238 are pinned to ends 236 at one end and to a slotted connector 240 at the other end where the struts are connected to either rear side of chair 230.

The sliding of support struts 238 along slotted connectors 240 permits wheel frame 226 to pivot from the stowed condition to a locked position for the deployed condition. FIG. 11 shows in broken lines the stowed condition of wheel frame 226. The stowed condition is also shown in broken lines in the back view of FIG. 12.

Footrest 242 is linked at pin joints 244 to the front side of chair 230. A slotted linkage 246 also connects footrest 242 to the front vertical sections of front wheel portion 232 of wheel frame 226. The footrest 242 serves to support the front edge of the chair 230 while the infant seat is being used as a car seat. This condition is shown in FIG. 11 in broken lines.

Front wheels 222 can be pivoted 180° about pin joints at front wheel portion 232 of wheel frame 226. As shown in broken lines in FIG. 11, the rotation of front wheels 222 positions the wheels in either an upper position 248 or a lower position 250. While the infant seat is used as a car seat, front wheels 222 support the rear edge of the chair 230 above the automobile seat. When locked in the upper position 248, the infant seat is in a rearward-facing car seat configuration. When front wheels 222 are locked in lower position 250, the infant seat is in a forward-facing car seat configuration.

Figure 14:
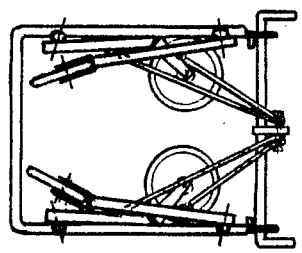
FIG. 14 is a plan view of the wheel frame of the fourth embodiment in a stowed configuration.
Figure 13:
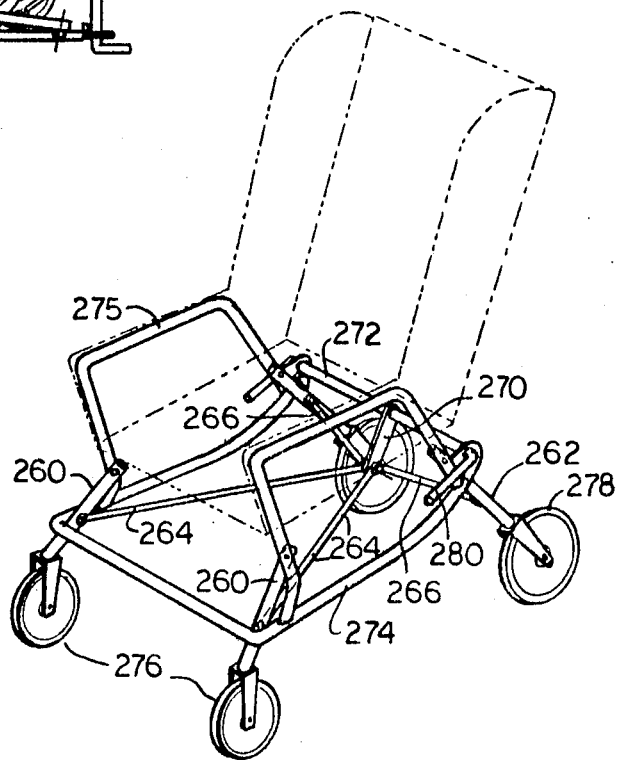
FIG. 13 is an isometric view of the wheel set and wheel frame of a fourth embodiment of the invention with the seat shown in phantom lines.

A fourth embodiment of the wheel frame is shown in FIGS. 13, 14 and 15. In this embodiment, each wheel is mounted to a front wheel strut 260 or a rear wheel strut 262. Each wheel strut 260, 262 has a rib 264, 266 mounted with a pin joint to the strut and extending to a pin joint with a crank 270. An opposite end of crank 270 is fixedly mounted to a shaft 272 which rotates about a connection to a U-shaped wheel frame 274. Wheel frame 274 circumscribes struts 260 and 262, limiting the extent to which the struts can extend while the wheels 276, 278 are deployed. The chair is connected to wheel frame 274 through side frames 275.

The crank 270 rotates about shaft 272 to deploy and stow wheels 276, 278. Crank handles 280 are fixed along the ends of shaft 272. As the adult turns crank handles 280, ribs 264, 266 are retracted or extended to stow or deploy wheels 276, 278.

As can best be seen in FIG. 15, wheel frame 274 has a curved portion 282. While wheels 276 and 278 are stowed beneath the chair, curved portion 282 supports the chair above a surface so that the infant seat may also be used as a rocker. FIG. 14 illustrates the plan view of the stowed configuration.

FIGS. 16-21 illustrate a fifth embodiment of the wheel frame. This embodiment is characterized by a deployment mechanism for the rear wheels which automatically splays apart the rear wheels as the wheel set is deployed.

Wheel frame 284 of the fifth embodiment structurally defines the wheel base for front wheels 286 and rear wheels 288. The front wheels 286 are pivotally mounted to a U-shaped front wheel strut 290, while rear wheels 288 are fixedly mounted on identical, individual rear wheel struts 292. The free ends of rear wheel struts 292 have a slightly skewed pin joint connection 312 to the back end of the chair seat. These skewed (relative to wheel axis) pin joints cause the rear wheel struts 292 to splay outwardly when deployed. Front wheel strut 290 is connected to rear wheel strut 292 via a U-shaped linkage 294.

The free ends 296 of linkage 294 are jointed to slots 298 in front wheel strut 290. The bent corner portions 300 of linkage 294 are threaded through guide pieces 302 fixedly mounted on each rear wheel strut 292. Linkage 294 rotates freely through guide pieces 302. Detailed views of the interaction between guide pieces 302 and linkage 294 are provided in FIGS. 19 and 20.

Wheel frame 284 is shown in its deployed condition in FIGS. 16 and 18. FIG. 16 illustrates the stroller configuration with the rear wheels 288 locked in the deployed condition by a spring loaded lock lever 304 which slides into lock holes 306 appropriately located in each rear wheel strut 292.

FIG. 17 illustrates the forward-facing car seat configuration in solid lines with the rearward-facing configuration shown in broken lines. The stowed condition of wheel frame 284 results in the chair being supported on the automobile seat by either the footrest 50 or the handle 40 along the front edge of the chair and wheels 286 along the back edge of the chair. The wheels 286 pivot 180° about their wheel coupling 287 to convert from the position shown in solid lines to support the chair in the forward facing condition to the position shown in broken lines for the rearward-facing condition. Rear wheel struts 292 are stowed along either side of the chair back.

Pin joints 312 force rear wheel struts 292 to splay apart as wheel frame 284 is deployed. This provides for a wider wheel base and enhances the stability of the stroller or carriage. Guide pieces 302 are configured to act as positioning cams for linkage 294 to lock rear wheel struts 292 in their deployed position.

To deploy the wheel set of the fifth embodiment from the stowed condition (FIG. 17) to the deployed condition, the rear wheel struts 292 and the front wheel strut 290 are allowed to rotate about pin joints 312 and 314, while linkage 294 is being rotated about pin joints between ends 296 and the pin joint through guide pieces 302. In the stowed condition, or as the wheel set is being deployed, the linkage is positioned as shown in FIG. 19 and in solid lines as shown in FIG. 20. As the wheel set is deployed, it assumes the position shown in broken lines in FIG. 20, with a portion of linkage 294 seating in channels 308 of each guide piece 302. The curved portion 310 of each guide piece 302 directs linkage 294 into channel 308. Cams 302 on rear wheel struts 292 can also be used to guide corner 300 of the synchronizing linkage 294 such that linkage 294 forces the rear wheel struts to splay outwardly without the use of a skewed pin joint 312. Pin joint 312 would have a looser pin connection to allow slight spreading of the rear wheel struts 292.

Figure 21:
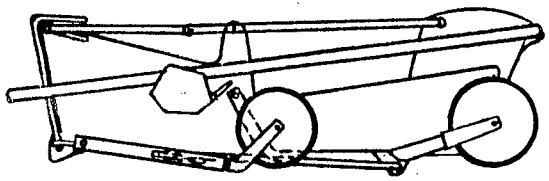
FIG. 21 is the bed configuration of the fifth embodiment.

Slots 298 in front wheel struts 290 allow the wheel frame 284 to assume the car bed configuration shown in FIG. 21. To configure the infant seat as the car bed, the chair back is reclined with respect to the chair bottom, with wheel frame 284 in the stowed condition of FIG. 17. Front wheels 286 are rotated about coupling 287 as if they were to assume the rearward-facing car seat configuration. Free ends 296 of linkage 294 slide along slots 298 to permit the wheel frame 284 to assume the configuration for the car bed of FIG. 21.

Various other features have been illustrated which can be combined with any of the five embodiments already described. For instance, an accessories basket 70 (FIG. 5) may be suspended to hang behind and below chair back 14. Basket links 72 connecting the basket bottom 74 to the lower end corners of vertical segments of seat 13 at pin joints 76 can coordinate the basket 70 so that it folds upwardly and flush against the chair back 14 when the wheel frame and wheel set are in the stowed condition for car seat 60 or 62.

A sunshade 80 (FIG. 5) can be pivotably connected at pin connections 88 to the upper edge of chair back 14. It can be segmented into a front segment 82 and rear segment 84 such that a hinge joint 86 folds the sunshade 80 to extend forward of the chair back 14 to provide a shade for the infant seated in the chair. When not needed, segments 82 and 84 pivot about pin connection 88 to fold flat against the back surface of chair back 14.

Figure 22:
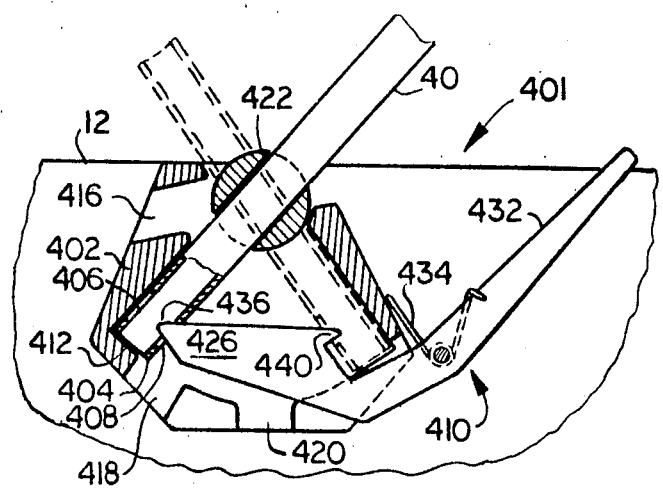
FIG. 22 is a cross sectional side view of the handle lock assembly.
Figure 23:
FIG. 23 is an isometric view of the guide member.
Figure 24:
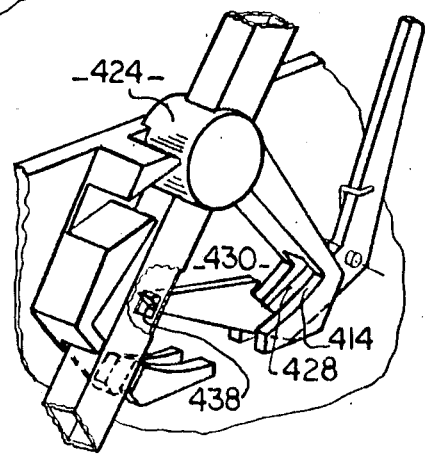
FIG. 24 is an isometric view of the handle lock housing with the handle and latch lever shown for one position.

FIGS. 22-24 illustrate the handle lock assembly 401 which can be used in any of the previously described embodiments to lock the handle 40 in a variety of positions for the configurations of the infant seat. Identical handle lock assemblies (401) are disposed on either side of the infant seat. The housing 402 may be molded integrally with the chair 12 or may be constructed separately and mounted on the chair assembly 12 or wherever desired on the frame. Not shown in the figures is a cover plate which is fixed over housing 402 to enclose all moving parts and prevent any possibility of exposing the infant to any parts which might pinch the infant's fingers.

Basically, the housing 402 provides for the variety of lock positions for the terminal ends 404 of the handle 40. Holes 406 and 408 in handle 40 define lock stations spaced along the length of handle 40 which engage latch lever 410 at various locations in some of the lock positions to hold the handle 40 in place. In the embodiment illustrated in FIGS. 22-24, five lock positions are shown, although as a matter of design, more or fewer lock positions can be provided. In this particular embodiment, two ledges 412 and 414 and three openings 416, 418 and 420 define the five lock positions.

In addition to the housing 402, one other part is required for the handle lock assembly 401. A guide member 422 is seated to rotate in an aperture 424 complementarily sized in housing 401. If necessary, guide member 422 might be eliminated. FIG. 23 is a detail view of guide member 422 and the diametric bore 423 through which the handle end 404 is slidably threaded. Latch lever 410 is the remaining major component of the handle lock assembly 401, and is pivotally mounted in relation to the housing so that portions of its arm 426 are positioned to engage holes 406, 408 and 438 (along the handle for stowed position) depending on the lock position being used.

As can best be seen in FIG. 24, arm 426 of latch lever 410 pivots through a channel 428 in housing 402 to extend within the generally wedge-shaped opening 430 defined within housing 402. The lever arm 432 extends away from housing 402 and is manually actuated to release handle 40 from engagement with arm 426. A torsion or linear spring 434 biases the latch lever 410 towards the locking position shown in FIG. 24.

Opening 416 defines the handle lock position illustrated in FIG. 21 where the infant seat is configured as a bed. Since the handle 40 is not used to lift, push or pull, no force must be resisted by the handle. Therefore, latch lever 410 does not engage handle 40, and opening 416 simply provides a passive position to stow the handle 40 out of the way.

Ledge 412 defines the handle lock position where the infant seat is pushed from behind the chair back, such as the stroller configurations. Handle end 404 abuts ledge 412 which provides resistance against the pushing force while the tips 436 and 440 engage either hole 408 or 406 respectively in handle 40 to prevent handle 40 from pivoting about the horizontal axis of guide member 422.

The chair of the infant seat may be constructed from any suitable rigid material. Because the chair is intended for use as a car seat as well as a stroller, weight is a consideration in choosing the materials of construction. The car seat can be removed from the automobile and converted into a stroller without removing the infant from the chair. To assist in this process, it is desirable that the infant seat be as lightweight as possible. However, as the infant seat is being used as a stroller, it is equally important that the frame and chair components are sufficiently strong to support the infant's weight as well as to survive the rigors of use. Any number of aluminum alloys or combinations of plastic, composite materials and metal materials would be suitable for these purposes.

Figure 25:
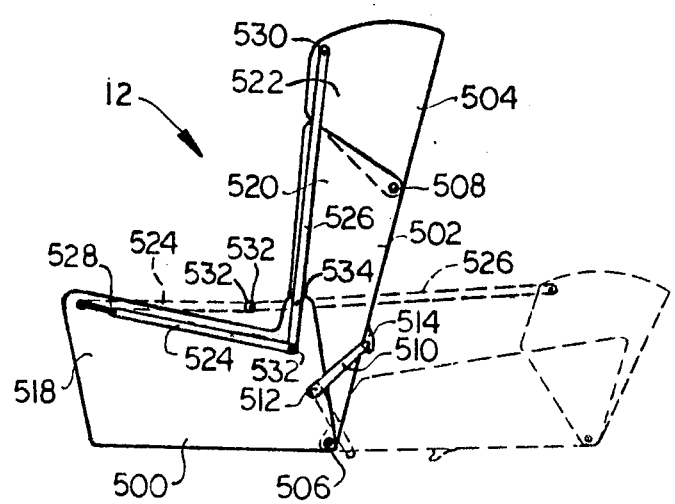
FIG. 25 is a side view of the chair in an upright position with the reclined position shown in broken lines.

FIG. 25 illustrates the side views of a chair assembly 12 construction which is suitable for any of the previously described infant seat embodiments. This particular assembly consists of three segments - a chair bottom 500, a chair back 502 and head piece 504. All three segments are easily molded or otherwise formed from any suitably lightweight yet rigid material.

Chair bottom 500 and chair back 502 are jointed relative to one another along either side at joints 506, while chair back 502 and headpiece 504 are jointed relative to one another along either side at joints 508.

Chair bottom 500 and chair back 502 are also locked in position by a lock arm 510 pivotably connected to chair bottom 500 at a pivot point 512 and to chair back 502 at a locking cuff 514. When chair back 502 is upright with respect to chair bottom 500, lock arm 510 is locked into locking cuff 514. When chair back 502 is reclined with respect to chair bottom 500, as shown in broken lines in FIG. 25, lock arm 510 is disengaged from locking cuff 514. Other means may also be employed for locking the chair back to chair bottom.

Each chair segment 500, 502 and 504 include side panels 518, 520 and 522 respectively. Side panels 518, 520 and 522 form the side walls of the area occupied by the infant when the chair back 502 is reclined with respect to the chair bottom 500. In a simplified version of the chair, the side panels can be eliminated.

The retracted position for side wall extenders 524 and 526 is shown in solid lines in FIG. 25. Side panels 518, 520 and 522 may not have sufficient vertical height to provide a bed area with sufficiently protective walls in the reclined position. Side wall extenders 524 and 526 arranged along the side panels provide additional vertical wall height. Side wall extender 524 has a sliding pin joint 528 with preferably a slidable connection to side panel 518 of chair bottom 500. The slidable pin connection may be provided at pinned connection 532 on either side extenders 524 and/or 526 instead of side panel 518. Side wall extender 526 has a pin joint 530 to side panel 522 of headpiece 504. The opposite ends of side wall extenders 524 and 526 have a mutual pin joint 532. Side wall extender 526 pivots about a pivot point at pin joint 534 on side panel 518. The reclined position with side wall extenders 524, 526 extended is shown in broken lines in FIG. 25.

The foregoing is a complete description of the invention, but is not intended to limit the scope of the invention, except as stated in the appended claims. While the above provides a full and complete disclosure of the preferred embodiments of the invention, various modifications, alternate constructions and equivalents may be employed without departing from the true spirit and scope of the invention. For example, the embodiment described herein and shown in the drawings discloses an infant seat which has only one chair, one frame and one wheel set. An infant seat could easily be constructed having two chairs side by side so as to seat twins or two small children either as a car seat, or as a stroller. Therefore, the above description and illustrations should not be construed as limiting the scope of the invention which is defined by the appended claims.

What is claimed is:

1. An infant seat, converting from a car seat which can be secured to an automobile seat to a stroller, comprising:

a chair, having a back, and a bottom;

a wheel frame connected to said chair, wherein said wheel frame further comprises a front wheel strut configured as a loop, said loop being continuous and unitary, said loop having a generally rectangular shape consisting of two horizontal portions and two vertical side portions, along two of the corners of which said rectangle shape, front wheels of said wheel set are mounted, and having a frontal barrier portion, said frontal barrier portion extending across the front of said chair while said wheel frame is deployed, said loop generally being bent along said side portions into a generally L-shape, said loop pivotally connected to chair side panels near the apex of said bends in said side portions; and a wheel set mounted to said wheel frame including said front wheels and rear wheels, said wheel frame configured into a stowed position when the infant seat is secured to the automobile seat and configured into a deployed position to convert the infant seat into a stroller, said wheel frame connecting said front wheels to said rear wheels such that said wheel set is synchronized to deploy said front wheels and said rear wheels simultaneously as the infant seat is converted from a car seat into a stroller.

2. The infant seat of claim 1, wherein said wheel frame further comprises a rear wheel strut configured as a U-shaped member, wherein free ends of said U-shaped member are pivotally mounted to said chair adjacent the rear side of said chair bottom, and said rear wheels of said wheel set are mounted to extend behind the lower opposite corners of said U-shaped member.

3. The infant seat of claim 1, further comprising a handle, wherein said handle is movably linked to said chair such that said handle may be locked in a first position extending in front of said back of said chair and a second position behind said back of said chair.

4. The infant seat of claim 3, wherein said handle may be locked in a third position between said first and second positions to serve as a lifting handle.

5. The infant seat of claim 1, wherein said wheel frame further comprises a rear wheel strut, said rear wheel strut pivotally mounted to said chair, said wheel frame further comprising a linkage means, said front wheel strut and said rear wheel strut connected by said linkage means, said linkage means synchronizing said front wheel strut and said rear wheel strut when converting said wheel frame from said stowed position to said deployed position, wherein said linkage means of said wheel set in said stowed position can be adjusted to convert from a forward-facing car seat configuration to a rearward-facing car seat configuration.

6. The infant seat of claim 5, wherein said rear wheel strut comprises a left arm and a right arm, each arm having one end pivotably mounted to the back edge of said chair, with a rear wheel mounted to the opposite end of said arm, said left arm and said right arm connected to each other and to the front wheel strut by said linkage means.

7. The infant seat of claim 5 wherein said rear wheel strut comprises a second frame piece, said second frame piece generally U-shaped with the free ends of said second frame piece pivotally mounted on either side of said chair, with a rear wheel mounted at opposite sides of the closed portion of said second frame piece, said linkage means connected to said second frame piece near said rear wheels.

8. The infant seat of claim 5, wherein said linkage means has a pinned connection to said front wheel strut and a slotted axial connection to said rear wheel strut, wherein said slotted connection is laterally movable.

9. The infant seat of claim 5, wherein said chair further comprises a footrest pivotably mounted along the front of said chair, wherein said footrest further comprises at least one footrest link connecting said footrest to said front wheel strut such that said footrest lowers into a deployed position as said wheel frame is converted into said deployed position, and said footrest assumes a stored position as said wheel frame is converted to said stowed position.

* * * * *